United States Patent [19]
Nonis et al.

[11] Patent Number: 5,951,805
[45] Date of Patent: Sep. 14, 1999

[54] METHOD AND APPARATUS FOR COATING A DECORATIVE WORKPIECE

[76] Inventors: Vittorino Nonis, 91 Rowntree Mill Rd., Weston; Oscar Chiarotto, 32 Taylorwood Ave. E., Bolton; Angelo Rao, 220 Thomson Creek Blvd., Woodbridge, all of Canada, L4H 1H1

[21] Appl. No.: 08/942,587

[22] Filed: Oct. 2, 1997

[51] Int. Cl.⁶ .............. B29C 47/00; B05D 3/12; B05D 3/02
[52] U.S. Cl. ............ 156/244.12; 427/356; 427/358; 427/372.2; 264/171.13; 264/136
[58] Field of Search .................. 427/356, 358, 427/372.2; 118/125, 500, 239; 156/244.12; 264/136, 177.17, 338, 171.12, 171.13, 171.23; 198/388

[56] References Cited

U.S. PATENT DOCUMENTS

| | | |
|---|---|---|
| 138,767 | 5/1873 | Shepard . |
| 1,974,256 | 9/1934 | Bergstein ........................... 118/239 |
| 2,382,236 | 8/1945 | Laxo ................................. 118/239 |
| 3,142,371 | 7/1964 | Rice et al. ........................ 198/388 |
| 3,693,675 | 9/1972 | Allen ................................ 143/22 |
| 3,713,421 | 1/1973 | Rash ................................. 118/239 |
| 4,220,115 | 9/1980 | Brossman et al. ................. 118/684 |
| 4,488,917 | 12/1984 | Porter et al. .................... 156/39 |
| 5,209,809 | 5/1993 | Walter et al. ..................... 156/539 |
| 5,326,592 | 7/1994 | Goewey et al. .................. 427/256 |
| 5,514,417 | 5/1996 | Matthews et al. . |
| 5,672,391 | 9/1997 | Santarossa ....................... 427/356 |

FOREIGN PATENT DOCUMENTS

| | | |
|---|---|---|
| 2184205 | 3/1997 | Canada . |
| 28 04 326 | 8/1979 | Germany . |
| 3932573 | 4/1991 | Germany . |
| WO 96/31330 | 10/1996 | WIPO . |
| WO 98/25745 | 6/1998 | WIPO . |

Primary Examiner—Shrive Beck
Assistant Examiner—Michael Barr
Attorney, Agent, or Firm—Young & Basile, P.C.

[57] ABSTRACT

The invention provides a simple, efficient and reliable method and apparatus for making decorative moldings used widely in the construction industry. The method comprising the steps of continuously advancing a workpiece in a straight, horizontal plane while preventing lateral horizontal movement and restraining vertical movement, applying a plaster coating material under pressure to the exposed irregular decorative surface of the workpiece and advancing the coated workpiece through a die opening closely conforming to the cross-sectional profile of the workpiece, wherein the cross-sectional size of the die opening relative to the cross-sectional size of the workpiece determines the thickness of the plaster coating material left remaining on the decorative surface of the coated workpiece.

16 Claims, 3 Drawing Sheets

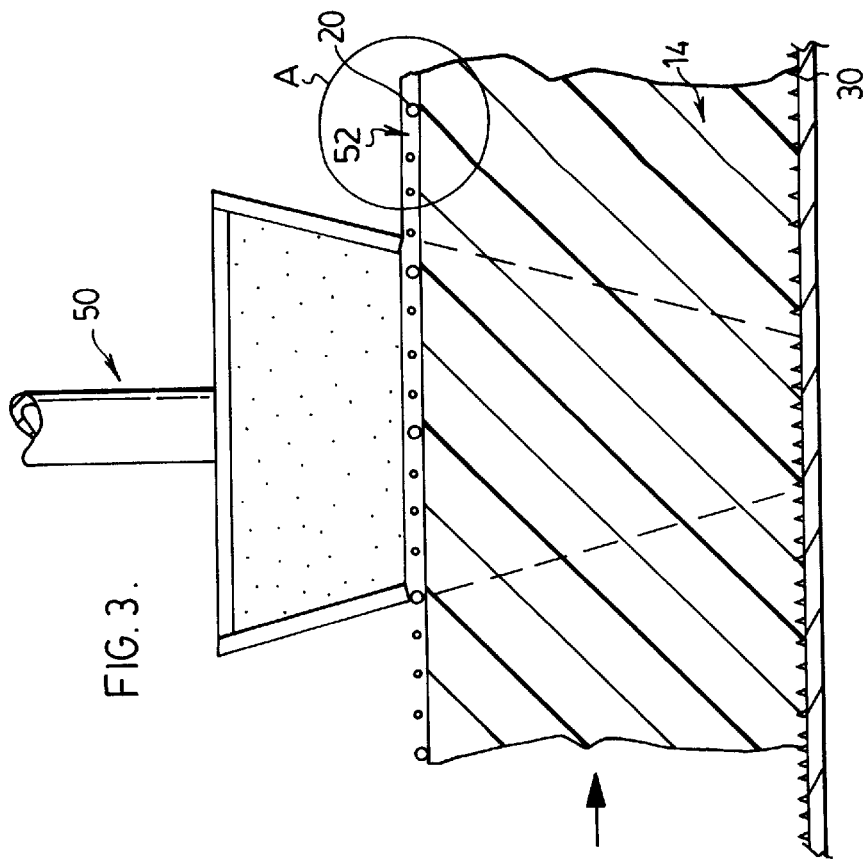
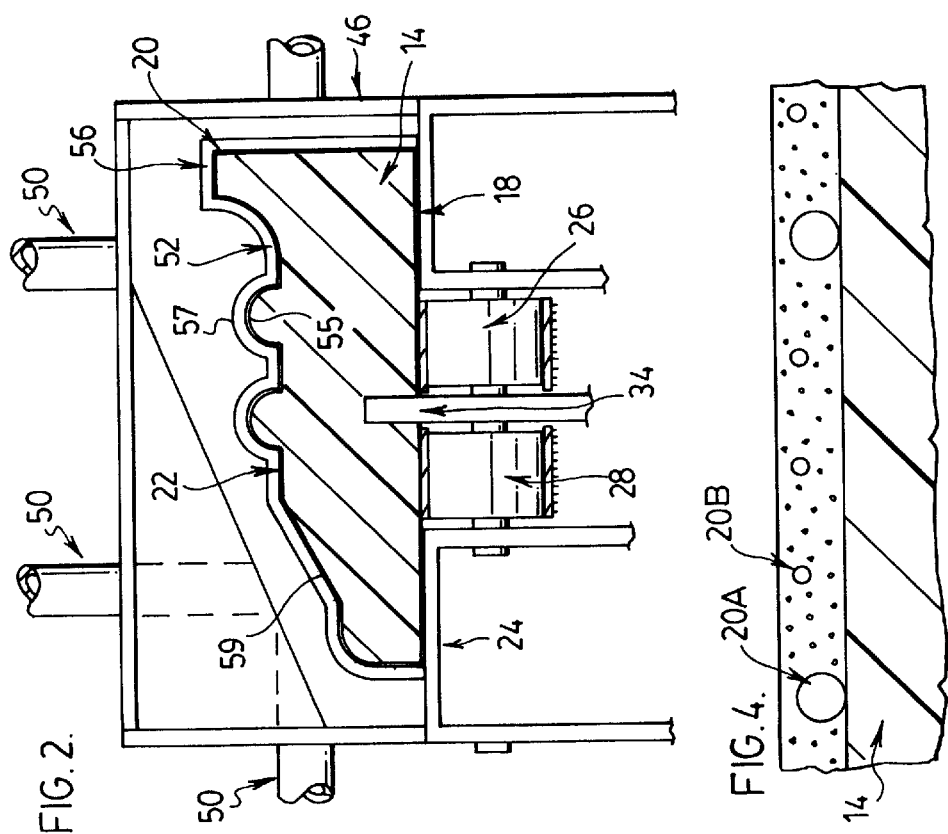

METHOD AND APPARATUS FOR COATING A DECORATIVE WORKPIECE

FIELD OF THE INVENTION

This invention relates to decorative mouldings and more particularly to a method and apparatus for coating preformed moulding workpieces having decorative surfaces.

BACKGROUND OF THE INVENTION

Preformed workpieces such as decorative mouldings are widely used in the construction industry. Such mouldings are designed to be mounted against exterior or interior walls for providing architectural features on building structures in sectors such as residential, industrial, communercial and institutional buildings. The exposed surface of the moulding is usually decorative and as such, has an irregular surface in cross-section and continuous in the longitudinal direction. Mouldings can be fabricated from several materials including wood, plaster and expanded polystyrene (EPS). EPS mouldings are particularly attractive to use because of their relatively light weight and ease of fabrication. In order that the moulding be both attractive and durable, moulding substrates or workpieces are typically coated with various coating materials to provide an attractive finish to the product. Traditionally, mouldings have been coated by band after the EPS moulding is secured to the exterior of the structure. This involved applying with hand tools, a layer of base coat to the moulding and then embedding a fiberglass mesh onto the moulding and allowing it to dry. A layer of stucco or special paint as a finish coat is then finally applied to the base coated moulding. This method is very labor intensive and consequently, very slow and expensive. Often times, the quality of the applied coating is not consistent due to poor workmanship. This results in a coating of uneven thickness which eventually cracks and does not look very attractive.

More recently, various types of automated equipment have been designed to apply coatings to different types of workpieces. For example, U.S. Pat. No. 5,514,417 discloses a method and apparatus for coating a molded fibrous, workpiece with a foam material. In this method and apparatus, the workpiece is passed through a foam bath within a coating chamber. To ensure a good coating of the workpiece, the foam material is spread over the entire exterior surface of the workpiece using wipers within the coating bath.

Canadian patent application 2,184,205 discloses a method and apparatus for providing a coating material onto the surface of a workpiece. In this method, the workpiece is passed through a bath of coating material contained within a coating chamber for applying under weight of the material, a coating. The workpiece is advanced on a platform by a set of guide rollers abutting both sides of the workpiece both before and after passing through the coating bath. While this method and apparatus does provide a coating on the decorative surface of the workpiece, the resultant coating may be inconsistent with respect to its thickness. This is partly due to the fact that the workpiece moves about on the platform as it is being guided into the coating chamber. This is also true when the workpiece exits the coating bath, as lateral, horizontal and vertical movement will result in varying thicknesses of coating material being applied to the surface of the workpiece as it exits the coating bath, Furthermore, once in the coating chamber, the coating material under gravity may not evenly distribute into the intricate curves present on the exterior design of the workpiece. The coating material can bubble on the surface of the workpiece due to having the workpiece pass through a bath of thick, viscous coating material at varying speeds which results in different rates of shear of the material at the bath exit. Consequently, parts of the workpiece will not be coated adequately or not at all. Once the workpiece exits the bath, it is not allowed to dry sufficiently before the guide rollers, continue to advance it forward and thus contact the wet coated workpiece and possibly damage its coating. Also, it is required that the coated mouldings air dry for at least 24 hours.

There is therefore a need to develop a novel method and apparatus for coating decorative workpieces used widely in various construction sectors, in a consistent, simple, efficient manner such to provide a smooth coating distributed in a controlled manner over the entire exposed decorative surface of a workpiece.

SUMMARY OF THE INVENTION

In accordance with the present invention there is provided a method and apparatus for applying a plaster-like coating material under pressure to the decorative exposed surface of a moulded workpiece. Both the method and apparatus provide on a consistent basis, a smooth coating with a controlled thickness to the entire exposed decorative surface of a workpiece. The method and apparatus avoid the problems of having air bubbles, cracks or an uneven thickness of coating material left on the coated workpiece. The method and apparatus provide a simple, efficient, cost effective and reliable means for applying a plaster-like coating to the exposed decorative surface of a workpiece such that they can be coated and used widely on a commercial scale in the construction industry.

According to an object of the present invention there is provided an apparatus for applying a plaster-like coating material under pressure to exposed surfaces of a preform workpiece having a decorative exposed surface and a bottom portion, said apparatus comprising:

means for advancing a workpiece in a straight horizontal plane through said apparatus;

means for engaging a workpiece to constrain lateral sidewards movemnent as it passes through said apparatus;

means for restraining vertical movement of a workpiece as it passes through said apparatus; and means for applying a plaster-like coating material under pressure to a decorative surface of an advancing workpiece, wherein said coating means also has a means for providing a desired thickness of a coating material onto the decorative exposed surface of an advancing workpiece.

Additionally, the apparatus may also include a mesh laminating means located upstream of the coating means.

According to another object of the present invention is a method for applying a plaster-like coating material to exposed surfaces of a preform workpiece having a decorative exposed surface and a bottom, said method comprising the steps of:

continuously advancing said workpiece in a straight, horizontal plane while preventing lateral horizontal movement and restraining vertical movement;

applying a plaster-like coating material under pressure to the exposed irregular decorative surface of the workpiece; and advancing the coated workpiece through a die opening closely conforming to the cross-sectional profile of the workpiece, wherein the cross sectional size of the die opening relative to the cross sectional size of the workpiece determines the thickness of the plaster-like coating material left remaining on the decorative surface of the coated workpiece.

BRIEF DESCRIPTION OF THE DRAWINGS

A detailed description of the preferred embodiments are provided herein below with reference to the following drawings in which:

FIG. 2 is a cross-sectional view through lines A—A of FIG. 1 showing a workpiece inside a coating chamber, FIG. 3 is a cross sectional view through lines B—B of FIG. 1 showing a workpiece inside the coating chamber, FIG. 4 is an enlarged view of segment A in FIG. 3.

Figure 1:
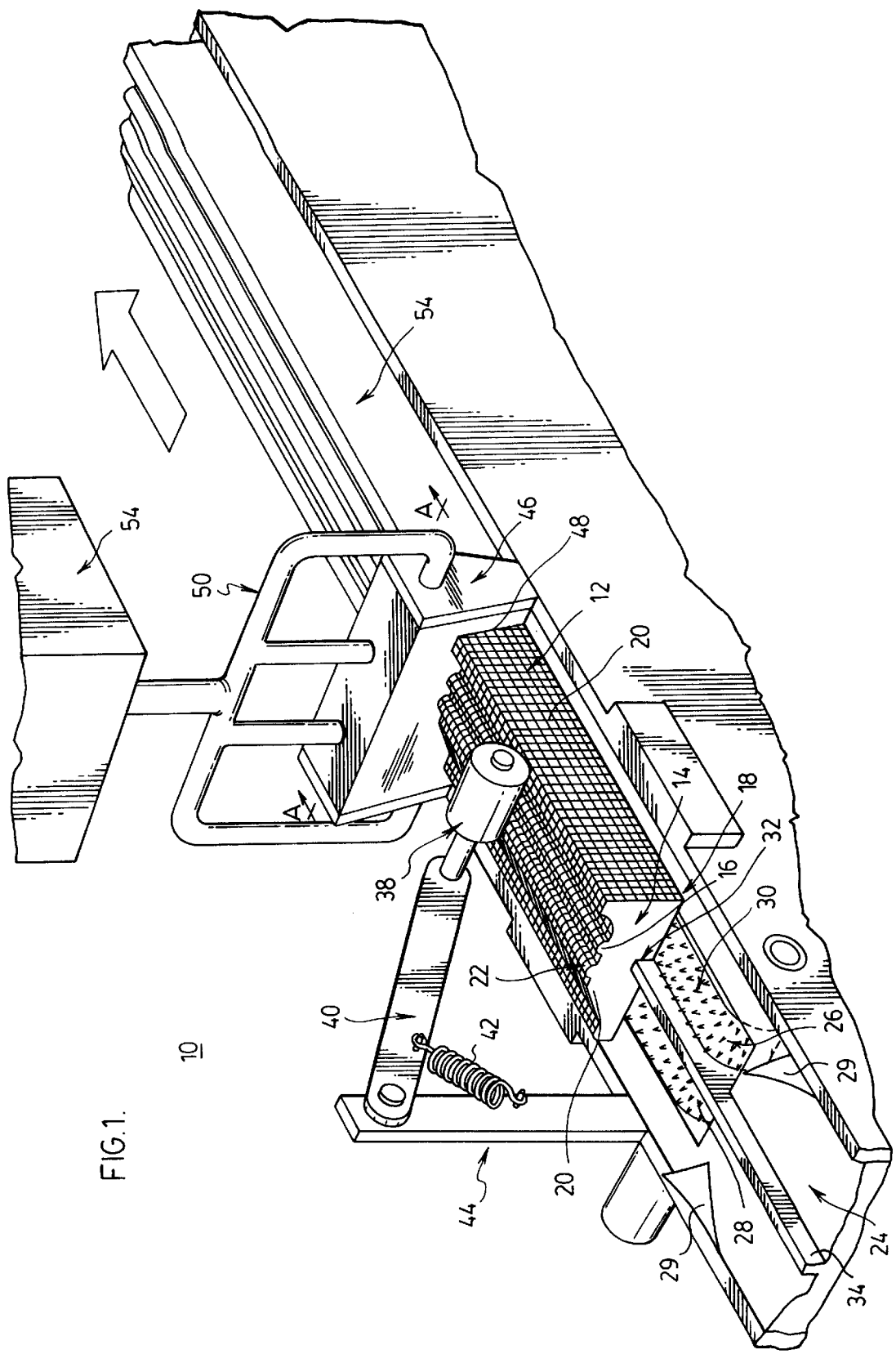
FIG. 1 is a perspective view showing the apparatus in accordance with a preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Referring to FIG. 1, there is illustrated the apparatus 10 of the present invention in which a workpiece 12 is coated. The workpiece 12 comprises a core 14 having an exterior decorative surface 16 which may be Irregular in cross-section, but consistent along the workpiece length. A bottom portion 18 is provided on the workpiece which may be flat. A mesh 20 covers the entire decorative surface 16 of the workpiece. The decorative surface provides a unique cross-sectional profile 22 for the workpiece.

The workpiece 12 is designed to be mounted on an exterior wall via its bottom portion 18, 18a being secured or mounted on a mounting surface and in this manner the irregular decorative surface 16 is clearly visible. The workpiece 12 can be fabricated to have several different styles of decorative surfaces by the provision of different cross-sectional profiles 22. It is understood that workpiece may be formed in a variety of ways depending primarily on the materials of construction. It may be milled, extruded or otherwise shaved. Preferably if the material is EPS, the block is fed through a hot wire system to cut the decorative surface outline and thereby provide an elongate workpiece ready for coating.

The apparatus 10 comprises a platform 24 which supports a conveyor system for advancing the workpiece through the apparatus. The conveyor system consists of a pair of adjacent conveyor belts 26, 28 onto which the workpiece 12 rests. The conveyor belts 26, 28 have several spikes 30 which protrude upwardly and into the bottom portion 18 of the workpiece 12 to prevent sidewards lateral movement of the workpiece 12 as it is being advanced and driven through the apparatus. The workpiece 12 also has a channel 32 in its bottom portion 18 which is engaged by a corresponding rail 34 located in the middle of the platform 24 and separating the conveyor belts 26, 28. This engagement in addition to the spiked conveyor belts, also acts to constrain lateral sidewards movements of the workpiece as it advances through the apparatus. This also ensures accurate positioning of the moulding as it is being advanced through the coating station of the apparatus to ensure that a controlled amount of coating is applied. Guides 29 are positioned on either side of the platform 24, and function to line up an incoming uncoated workpiece immediately preceding a workpiece being coated.

A rotating tension wheel 38 is biased against the top decorative surface of the workpiece. This wheel rotates along the decorative surface of the workpiece as it is advancing through the apparatus and helps to restrain vertical movement of the advancing workpiece. The tension wheel is mounted to the platform by an arm member 40 which is spring loaded via a spring 42 to a vertical support 44. It is understood by those skilled in the art that more than one tension wheel can be used, depending on the width of the moulding.

The workpiece 12 is advanced into an interchangeable coating chamber 46 via an inlet 48 closely conforming to the cross-sectional profile 16 of die workpiece through which the workpiece is advanced. The inlet is just large enough to allow the workpiece to enter the coating chamber but will not allow for the pressurized coating material to escape. Several conduits 50 enter and open into the chamber 46 through which a plaster like coating material 52 is fed under pressure from a reservoir 54. The pressurization of the coating material ensures that the coating material is applied to all of the intricate surfaces of the workpiece as it is being advanced through the coating chamber 46. This also ensures that the coating material not only penetrates through the mesh and infiltrates into surface crevices of the workpiece, but also that the mesh is impregnated in the coating material and is thereby adhered to the workpiece surface by the coating material. The conduits 50 enter and open into the coating chamber 46 at both the top and sides of the chamber to ensure that coating material 52 is constantly supplied to all regions of the chamber and is thereby applied to the entire decorative surface. Applying the coating material under pressure results in an even application of the coating material and less buildup of material in the chamber.

As better seen in FIG. 2, the workpiece 12 must move through the coating chamber 46 in a straight path in order that the now coated workpiece 54 can exit the coating chamber 46 via a die opening 56 closely conforming to the cross sectional profile of the coated workpiece in the proper orientation. This die opening 56 is slightly larger than the inlet 46 of the coating chamber so that a desired controlled thickness of coating material laminated under pressure is applied on the decorative surface of the workpiece as it exits the coating chamber.

It is understood by those skilled in the art, that while the die opening 56 defined by die plate edge 57 conforms to the cross sectional profile of the workpiece, the size and shape of the die opening can vary in order to provide a controlled thickness of coating material in selected regions of the decorative surface. It is the die shape that helps to provide the controlled thickness of coating material on the decorative surface of a workpiece. For example, the spacing of the die edge 57 from the workpiece surface may be greater at raised areas 55 of a decorative surface to provide a thicker coating in that region to ensure complete coating on the complex curves of the raised areas. It may also be desired to provide a thicker layer of coating material on flat portions 59 of the decorative surface of the workpiece where the workpiece will be adhered to a wall via a fastening means extending through the flat areas such as by use of retention screws. The thicker coating at 59, as such will provide a more secure fastening of the coated workpiece to a wall. The resulting coated workpiece 54 is then advanced and dried before being removed from the apparatus. It is preferred that the coated workpiece be placed in a dehydration chamber for 8–12 hours after which it can be shipped for sale and use. As is best seen in FIG. 3, the coating chamber has angled walls 47 in order to create a better shear edge at the point the coated moulding leaves the chamber.

The engagement of the workpiece to the platform of the apparatus via the rail 34 and the spikes 30 act together to move the workpiece into and out of the coating chamber in the straightest and most stable manner possible in order to consistently provide a controlled even thickness of coating onto the exposed surface of the decorative workpiece as it exits the coating chamber.

The workpiece used in the present method can be made of any suitable light weight material including wood and plastic. The preferred material is made of an expanded polystyrene (EPS) or polyurethane. The phrase "decorative surface" as used herein refers to the portion of the workpiece that is exposed and readily seen when the workpiece is mounted to a wall. The decorative surface can be of any intricate shape or design.

It is understood by those skilled in the art that the method of the present invention can be used on workpieces of varying cross sectional sizes and designs as well as lengths. This may be accommodated by having a coating chamber with varying sizes and configurations of inlet and exit die opening. The coating chamber, itself, can be fabricated in several sizes dictated by the size of the workpiece and the size of the profile of the workpiece. The size of the exit die opening determines the thickness of coating material and shape of coating material layered left on the workpiece as it exits the coating chamber. The thickness of coating material can vary from about 2–4 mm due to the provision of an exit die edge 57 being spaced a corresponding extent away from the decorative surface of the workpiece. However, it is understood by those skilled in the art that the thickness of coating material may also vary according to the needs of the customers.

The mesh used on the decorative surface is made from a fiberglass with a protective coating and acts to bind the coating material onto the surface of the workpiece to provide a hard, protective and attractive surface. The mesh has a tacky surface which adheres to the decorative surface of the workpiece and due to the coating material being applied under pressure, the mesh is impregnated with the hardened coating. The mesh is applied to the decorative surface as well asjust underneath the bottom flat edges of the workpiece to ensure that all surfaces and edges are properly coated and the mesh embedded. The bottom portion of the workpiece remains uncoated. As seen in FIG. 4, the mesh may be specifically engineered to comprise thick strands of glassfibre 20A interspersed with 4 to 6 thinner strands 20B of glassfibre. While the mesh is shown to comprise a criss cross pattern of mesh, it is also desirable to use a mesh which includes a longitudinal pattern of fibreglass strands with differing thicknesses. Thus the specifically engineered mesh allows for the coating material to flow underneath and embed the raised thinner strands 20B in the coating material, and into the intricate surface of the workpiece, such as in crevices, and in this manner, better adhere the mesh and the coating material to the surface of the workpiece.

It is understood by those skilled in the art that several different types of coating materials can be used in the method and with the apparatus of the present invention including cement-based and non-cement based so long as the coating dries to a fine smooth finish that is visually appealing.

Figure 5:
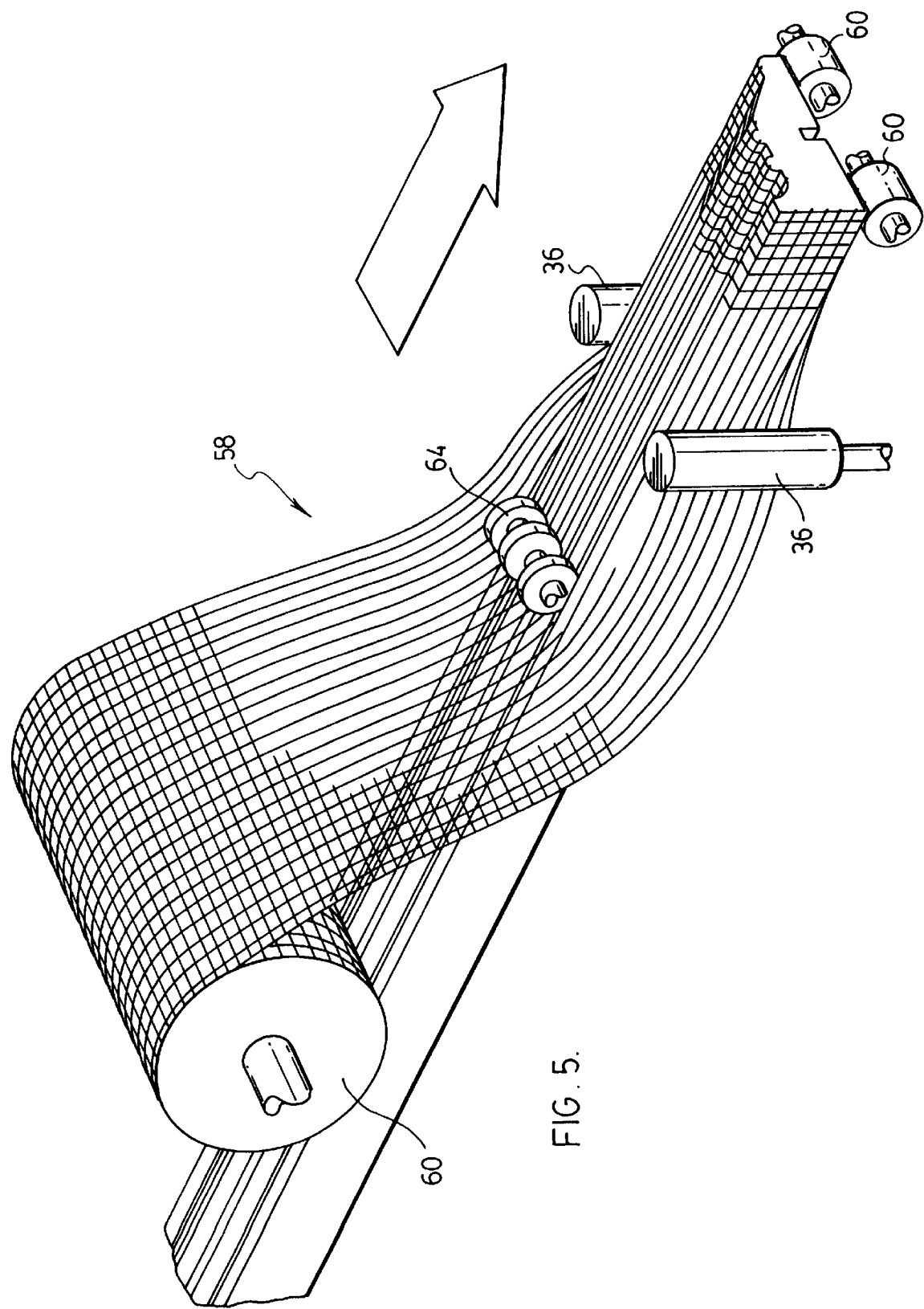
FIG. 5 is a perspective view showing a mesh applying portion of the apparatus in accordance with another embodiment of the present invention.

In another embodiment of the invention shown in FIG. 5, the apparatus has a mesh applying station 58 in advance of the coating chamber 46. Here, the workpiece is advanced towards the coating chamber on a set of guide rollers 60. A pair of opposing rotating wheels 36 are also positioned on either side of the workpiece to minimize lateral horizontal movement of the workpiece as it is being advanced through the apparatus. A large mesh roll 62 is supported above the surface of the workpiece and unveils as the workpiece is advanced. A roller 64 configured to mate with the decorative surface is positioned biased against the top of the mesh as it is being applied to the surface of the workpiece to ensure that the tacky side of the mesh adheres completely to the decorative surface. Once covered in mesh, the workpiece is then moved and guided to the coating portion of the apparatus.

It is understood by those skilled in the art that the apparatus of the present invention may include a continuous process whereby is first coated with mesh and then directly with coating material prior to drying. Alternatively, the apparatus may comprise one or more stations including dehydrating stations where desired. The distance between various stations may also vary.

In the method of the present invention, the workpiece having mesh adhered to its surface, is mounted onto the apparatus. The workpiece is advanced into the coating chamber via the inlet. Inside the coating chamber, coating material is fed under pressure in order to infiltrate and impregnate the intricate surface of the workpiece and the overlying mesh as it travels through the coating chamber. As the workpiece continues to advance, it exits the coating chamber through an exit die having a cross sectional profile which determines the desired thickness of coating to be applied. As such, the die profile may correspond essentially to the cross sectional profile of the workpiece or may be different in certain sections if it desired to have a thicker coating in certain regions of the decorative surface. The exit die may be slightly greater in cross sectional profile as compared to the workpiece in order to leave a desired thickness of coating material on the workpiece as it exits the chamber. The coated workpiece is then dried in a dehydration chamber prior to use. Throughout the entire coating method, the bottom portion of the workpiece never becomes exposed to coating material and therefore remains uncoated.

In summary, the method and apparatus of the present invention provides an improvement over methods and other automated coated machinery of the prior art. Both the present method and apparatus provide on a consistent basis, an even smooth coating with a desired controlled thickness to the entire exposed decorative surface of a workpiece. The method and apparatus avoid the problems of having air bubbles, cracks or an uneven thickness of coating material left on the coated workpiece and provide a simple, efficient, cost effective and reliable means for applying a plaster-like coating to the exposed decorative surface of a workpiece such that they can be coated and used widely on a commercial scale in the construction industry.

Although preferred embodiments have been described herein in detail, it in understood by those skilled in the art that variations may be made thereto without departing from the scope of the invention as defined by the appended claims.

We claim:

1. A method for applying a coating material to exposed surfaces of a preform workpiece having a decorative exposed surface and a bottom, said method comprising the steps of:

continuously advancing said workpiece in a straight, horizontal plane by engagement of the bottom of said workpiece with a pair of substantially adjacent conveyor belts supported on a platform and means for engaging said bottom of said workpiece, said engaging means being located between said pair of adjacent conveyor belts to prevent lateral horizontal movement;

feeding a coating material under pressure and applying said pressurized coating material under pressure to the exposed irregular decorative surface of the continuously advancing workpiece to provide a coated workpiece where said pressurized coating material maintains said workpiece bottom engaged with said engagement means; and advancing the coated workpiece through a die opening with said engagement means extending along said pair of conveyor belts and beyond said conveyor belts and through said die opening, said die opening closely conforming to the cross-sectional profile of the workpiece, wherein the cross sectional size of the die opening relative to the cross-sectional size of the workpiece determines the thickness or the coating material left remaining on the decorative surface of the coated workpiece, said engagement of said workpiece bottom with said conveyor belts and with said engagement means and said application of said pressurized coating preventing lateral horizontal movement and vertical movement so that the coated workpiece advances through said die opening in a straight horizontal plane to ensure an even thickness of coating material remains on the entire decorative exposed surface of the coated workpiece.

2. The method of claim 1, wherein said conveyor belts have a plurality of spikes protruding from the surface of said conveyor belts, said spikes penetrating into the bottom portion of the workpiece to prevent sidewards lateral movement of the workpiece as it is being advanced.

3. The method of claim 1, wherein the workpiece has a channel in said bottom portion and said engagement means comprises a corresponding rail extending vertically from said platform to prevent lateral horizontal movement while the workpiece is advancing.

4. The method of claim 1, wherein a tension wheel is biased against the top surface of the advancing workpiece to restrain vertical movement above said conveyors.

5. The method of claim 4, wherein said tension wheel is mounted to one side of the platform by a spring loaded arm member.

6. The method of claim 1, wherein said workpiece is advanced through a coating chamber through an inlet closely conforming to the cross-sectional profile of said workpiece, wherein a plurality of conduits enter and open into the chamber to provide a pressurized coating material from a reservoir onto the decorative exposed surface of the advancing workpiece.

7. The method of claim 6, wherein said coating material is fed onto the entire decorative exposed surface of the advancing workpiece via conduits positioned in top and side portions of the coating chamber.

8. The method of claim 7, wherein said coated workpiece is passed through said die opening in the coating chamber to exit the chamber, said die opening closely conforming to the cross-sectional profile of the coated workpiece and wherein the size of the die opening determines the thickness of the coating material allowed to remain on the coated decorative surface of the advancing workpiece.

9. The method of claim 8, wherein said coated workpiece is passed through a die opening conforming within approximately 2–4 mm of the cross sectional profile of the coated workpiece.

10. The method of claim 1, wherein said workpiece has a laminated mesh on its entire decorative exposed surface.

11. The method of claim 1, wherein said workpiece is made of a material selected from the group consisting of expanded polystyrene, polyurethane, wood and plastic.

12. The method of claim 1, wherein said workpiece is a decorative moulding.

13. The method of claim 1, wherein the coating material is plaster.

14. The method of claim 1, wherein said method additionally comprises a drying means to dry the coated workpiece.

15. The method of claim 14, wherein the coated workpiece is dried using a dehydration system.

16. The method of claim 1, wherein said coating material is a non-cement based material.

* * * * *